US009710019B2

(12) United States Patent
Kwon et al.

(10) Patent No.: US 9,710,019 B2
(45) Date of Patent: Jul. 18, 2017

(54) ELECTRONIC DEVICE

(71) Applicant: Samsung Electronics Co., Ltd., Suwon-si, Gyeonggi-do (KR)

(72) Inventors: Hyok-Soo Kwon, Suwon-si (KR); Sang-In Baek, Suwon-si (KR); Sun-Keun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/790,537

(22) Filed: Jul. 2, 2015

(65) Prior Publication Data
US 2016/0018851 A1   Jan. 21, 2016

(30) Foreign Application Priority Data
Jul. 17, 2014   (KR) ........................ 10-2014-0090383

(51) Int. Cl.
*G06F 1/16* (2006.01)
*H04B 1/3888* (2015.01)

(52) U.S. Cl.
CPC .......... *G06F 1/1647* (2013.01); *G06F 1/1616* (2013.01); *G06F 1/1626* (2013.01); *G06F 1/1632* (2013.01); *G06F 1/1635* (2013.01); *G06F 1/1652* (2013.01); *G06F 1/1654* (2013.01); *G06F 1/1683* (2013.01); *H04B 1/3888* (2013.01); *G06F 2200/1633* (2013.01); *G06F 2200/1634* (2013.01)

(58) Field of Classification Search
CPC combination set(s) only.
See application file for complete search history.

(56) References Cited

U.S. PATENT DOCUMENTS

| 5,900,848 A * | 5/1999 | Haneda | G06F 1/162 345/1.1 |
| 6,094,341 A * | 7/2000 | Lin | G06F 1/1616 345/905 |
| 6,487,068 B1 * | 11/2002 | Rahemtulla | G06F 1/1616 312/223.1 |
| 6,667,878 B2 * | 12/2003 | Ponx | G06F 1/1616 361/679.04 |
| 6,930,881 B2 * | 8/2005 | Karidis | G06F 1/1616 16/286 |
| 7,136,282 B1 * | 11/2006 | Rebeske | G06F 1/1616 345/1.1 |
| 7,466,306 B2 * | 12/2008 | Connor | G06F 1/1616 345/1.1 |
| 7,489,503 B2 * | 2/2009 | Maatta | G06F 1/1616 16/367 |

(Continued)

FOREIGN PATENT DOCUMENTS

| EP | 2 059 005 A2 | 5/2009 |
| KR | 10-2012-0022408 A | 3/2012 |

(Continued)

*Primary Examiner* — Lisa Lea Edmonds
(74) *Attorney, Agent, or Firm* — Jefferson IP Law, LLP

(57) ABSTRACT

An electronic device is provided. The electronic device includes a main body and a cover. A first display device is disposed on a first face of the main body. The cover includes a first cover member, on which a second display device is disposed, and a second cover member disposed on a second face of the main body. The second display device is electrically connected to the main body.

25 Claims, 12 Drawing Sheets

(56) References Cited

U.S. PATENT DOCUMENTS

| | | | | |
|---|---|---|---|---|
| 7,522,944 | B2* | 4/2009 | Hyun | G06F 1/1616 |
| | | | | 455/575.1 |
| 7,768,778 | B2* | 8/2010 | Huang | G06F 1/1632 |
| | | | | 340/5.1 |
| 8,279,592 | B2* | 10/2012 | Imamura | G06F 1/1616 |
| | | | | 361/679.02 |
| 8,310,844 | B2* | 11/2012 | Hashimoto | G06F 1/1681 |
| | | | | 361/755 |
| 8,355,755 | B2* | 1/2013 | Kim | G06F 1/1616 |
| | | | | 455/425 |
| 8,369,097 | B2* | 2/2013 | Murakami | G06F 1/1683 |
| | | | | 361/752 |
| 8,427,420 | B2* | 4/2013 | Yamazaki | G06F 1/1616 |
| | | | | 345/100 |
| 8,760,364 | B2* | 6/2014 | Kim | G06F 1/1616 |
| | | | | 345/1.2 |
| 9,134,762 | B2* | 9/2015 | Del Toro | G06F 1/1628 |
| 2004/0264118 | A1* | 12/2004 | Karidis | G06F 1/1616 |
| | | | | 361/679.55 |
| 2006/0160586 | A1 | 7/2006 | Cheng | |
| 2009/0073650 | A1* | 3/2009 | Huang | G06F 1/1632 |
| | | | | 361/679.56 |
| 2010/0048268 | A1 | 2/2010 | O'Neill et al. | |
| 2011/0286157 | A1 | 11/2011 | Ma | |
| 2013/0187833 | A1 | 7/2013 | Kim | |
| 2013/0260675 | A1 | 10/2013 | Chan et al. | |
| 2013/0301204 | A1 | 11/2013 | Yim et al. | |

FOREIGN PATENT DOCUMENTS

| | | |
|---|---|---|
| WO | 2012-005541 A2 | 1/2012 |
| WO | 2014-010797 A1 | 1/2014 |

* cited by examiner

ELECTRONIC DEVICE

CROSS-REFERENCE TO RELATED APPLICATION(S)

This application claims the benefit under 35 U.S.C. §119(a) of a Korean patent application filed on Jul. 17, 2014 in the Korean Intellectual Property Office and assigned Serial number 10-2014-0090383, the entire disclosure of which is hereby incorporated by reference.

TECHNICAL FIELD

The present disclosure relates to an electronic device.

BACKGROUND

According to the development of the information and communication industry, an electronic device serves as an important means for transmitting various information items to a user. As the degree of integration in the electronic device has increased, and ultra-high-speed and high-capacity wireless communication has been popularized, the electronic device may provide various functions and programs. In addition, the electronic device may provide the various functions and programs through, for example, a cover device.

An electronic device that provides a multimedia function may include various types of display devices. For example, as the electronic device is equipped with a display device capable of various functions, the outer appearance is gradually simplified and the use pattern of the electronic device is also simplified in order to secure portability by reducing the thickness and weight of the electronic device.

The above information is presented as background information only to assist with an understanding of the present disclosure. No determination has been made, and no assertion is made, as to whether any of the above might be applicable as prior art with regard to the present disclosure.

SUMMARY

According to the existing technology, for example, when a cover is functionally connected with the electronic device, there is a problem in that a connection portion between the electronic device and the cover may be easily damaged by external impact or the opening/closing operation of the cover. In addition, as a structure that allows battery replacement is provided, the connection with input/output devices mounted on the cover may not be precisely executed.

Aspects of the present disclosure are to address at least the above-mentioned problems and/or disadvantages and to provide at least the advantages described below. Accordingly, an aspect of the present disclosure is to provide an electronic device that is convenient to use while diversifying the external appearance of the electronic device.

Another aspect of the present disclosure is to provide an electronic device that is convenient to use while diversifying the use pattern of the electronic device.

Another aspect of the present disclosure is to provide an electronic device which is convenient to carry while diversifying the use pattern and external appearance of the electronic device.

In accordance with an aspect of the present disclosure, an electronic device is provided. The electronic device includes a main body having a first face, on which a first display device is disposed and a cover including a first cover member, on which a second display device is disposed, and a second cover member disposed on a second face of the main body. The second display device is electrically connected to the main body.

In accordance with another aspect of the present disclosure, an electronic device is provided. The electronic device includes a main body including a first face, on which a first display device is mounted, a first cover member including an inner face, on which a second display device is mounted, wherein the first cover member alternately opens and closes the first face of the main body, a second cover member provided to be alternately attachable to and detachable from a second face of the main body, a connection member at least partially fixed to the main body, in which each of the first and second cover members is pivotally connected to the connection member, and a support member that fixes one end of the connection member to the main body.

In accordance with another aspect of the present disclosure, an electronic device is provided. The electronic device includes a first body including a display and a second body pivotally coupled to the first body. The second body includes a first cover portion which is changeable in position with respect to the display, and a second cover portion fixed to at least one part of the first body at one side thereof. Another side of the second cover portion is alternately attachable to and detachable from another part of the first member.

According to various embodiments of the present disclosure, in an electronic device, a first cover member (e.g., a flip cover) that opens/closes a first face of a main body (e.g., the front face, on which the display device is provided) and a second cover (e.g., a battery cover) attached to/detached from a second face of the main body (e.g., the rear face, on which a battery mounting recess is formed) are capable of being pivoted while maintaining the state where the first and second cover members are coupled to the body through the connection member. Accordingly, it is possible to improve the convenience in use of the electronic device, such as the replacement of the battery, while contributing to the diversification of the external appearance of the electronic device. In addition, it is possible to variously implement the functions and use patterns of the electronic device by providing an additional display device on the first cover member.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
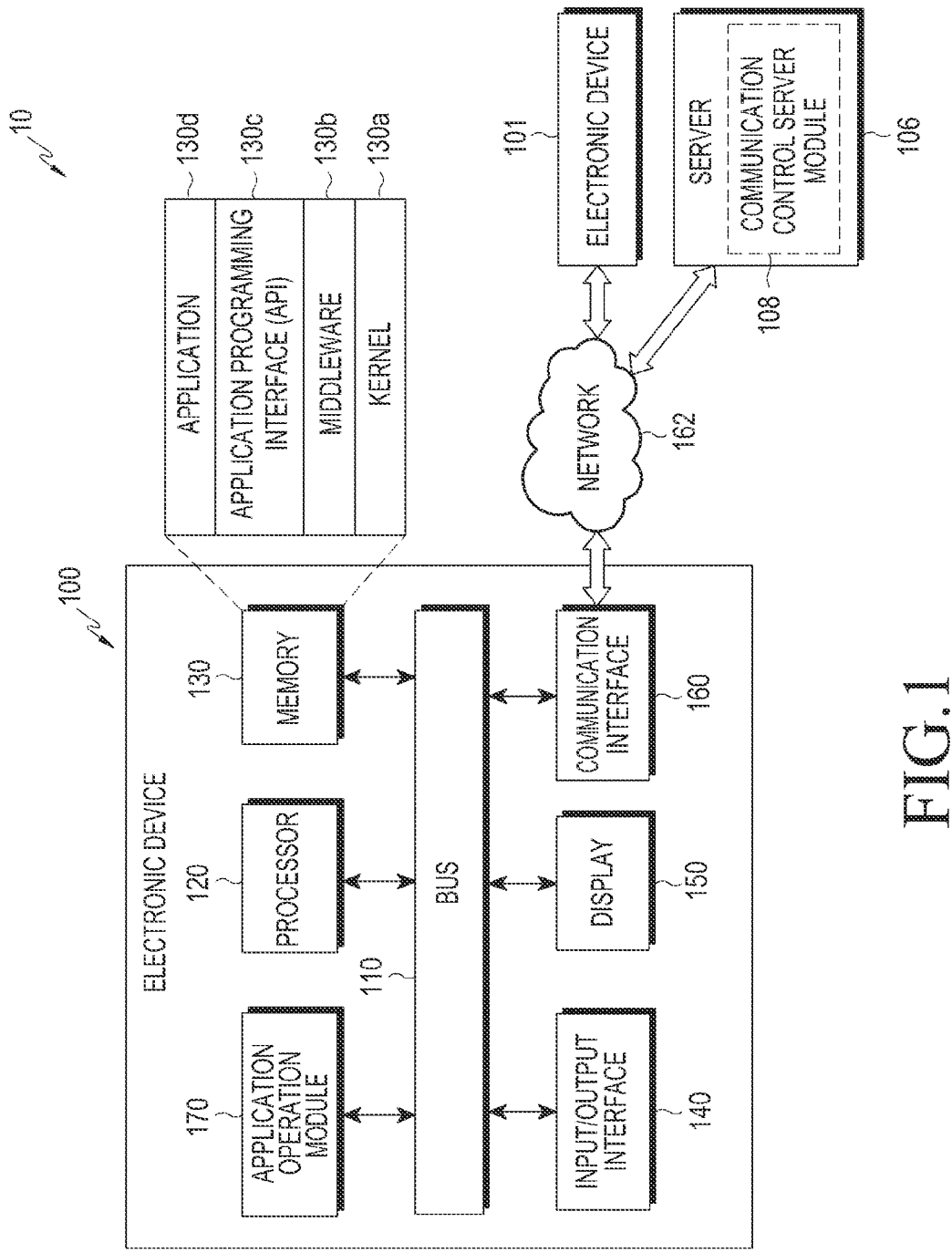
FIG. 1 is a view illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the present disclosure, the terms are used to describe a specific embodiment, and are not intended to limit the present disclosure. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude various embodiments of the present disclosure.

In the present disclosure, an electronic device may be a random device, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a Television (TV), a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display unit.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless LAN (WLAN), a Wide Area Network (WAN), an Internet, a Small Area Network (SAN) or the like, but is not limited thereto.

FIG. 1 is a view illustrating a network environment including an electronic device according to various embodiments of the present disclosure. With reference to FIG. 1, an electronic device 100 in a network environment 10 in various embodiments will be described.

Referring to FIG. 1, the electronic device 100 may include a bus 110, a processor 120, a memory 130, an input/output interface 140, a display 150, and a communication interface 160. Any embodiment may include an application operation module 170.

The bus 110 may be a circuit that interconnects the above-described components with each other, and delivers communication signals (e.g., control messages and/or data) between the above-described components.

The processor 120 may include at least one of a Central Processing Unit (CPU), an Application Processor (AP), and a Communication Processor (CP). The processor 120 may receive a command from any other components described above (e.g., the memory 130, the input/output interface 140, the display 150, the communication interface 160, or the application operation module 170) through the bus 110, decode the received command, and execute an arithmetic operation or data processing according to the decoded command.

The memory 130 may include a volatile memory and/or a non-volatile memory. The memory 130 may store a command or data received from the processor 120, or any other components (e.g., the input/output interface 140, the display 150, the communication interface 160, or the application operation module 170), or generated by the processor 120 or the other components. The memory 130 may include programming modules, such as, a kernel 130a, middleware 130b, an Application Programming Interface (API) 130c, or one or more applications 130d. At least some of the kernel 130a, the middleware 130b, and the API 130c may be referred to as an Operating System (OS). Each of the programming modules described above may be configured by software, firmware, hardware, or a combination of at least two thereof.

The kernel 130a may control or manage system resources (e.g., the bus 110, the processor 120, and the memory 130) used for executing operations or functions implemented in the other remaining programming modules, for example, the middleware 130b, the API 130c, and the applications 130d. In addition, the kernel 130a may provide an interface that allows the middleware 130b, the API 130c, or the applications 130d to access individual components of the electronic device 100 so as to control or manage the individual components of the electronic device 100.

The middleware 130b may act as an intermediary to allow the API 130c or the applications 130d to communicate with the kernel 130a so as to exchange data. In addition, the middleware 130b may execute a control for a task request (e.g., scheduling or load balancing), for example, using a method of allocating a priority capable of using a system resource of the electronic device 100 (e.g., the bus 110, the processor 120, or the memory 130) to, for example, at least one application among the applications 130d in connection with task requests received from the applications 130d.

The API 130c refers to an interface for allowing the applications 130d to control functions provided from the kernel 130a or the middleware 130b and may include, for example, at least one interface or function (e.g., command) for file control, window control, image processing, or character control, for example.

According to various embodiments of the present disclosure, the applications 130d may include a Short Message Service/Multimedia Messaging Service (SMS/MMS) application, an e-mail application, a calendar application, an alarm application, a healthcare application (e.g., an application for measuring, for example, exercise quantity or blood sugar), or environment information application (e.g., an application for providing atmospheric pressure, humidity, or temperature information). Additionally or alternatively, the applications 130d may be applications related to information exchange between the electronic device 100 and an external electronic device 101. The applications related to the information exchange may include, for example, a notification relay application for relaying specific information to the external electronic device 101, and a device management application for managing the external electronic device 101.

For example, the notification relay application may include a function of relaying notification information generated from the other applications of the electronic device 100 (e.g., the SMS/MMS application, the e-mail application, the healthcare application, or the environment information application) to the external electronic device 101. Additionally or alternatively, the notification relay application may receive notification information from, for example, the external electronic device 101 and provide the notification information to a user. The device management application may manage (e.g., install, delete, or update), for example, at least some functions (e.g., turning ON/OFF) of the electronic device 100 itself or some components thereof or adjustment of brightness or resolution of a display of the external electronic device 101 that communicates with the electronic device 100, or an application operated in the external electronic device 101 or services (e.g., a call service or a message service) provided from the external electronic device 101.

According to various embodiments of the present disclosure, the applications 130d may include an application designated according to an attribute (e.g., the kind of electronic device) of the external electronic device 101. For example, when the external electronic device includes an MP3 player function, the applications 130d may include an application related to music reproduction. Similarly, when the external electronic device 101 is a mobile medical device, the applications 130d may include an application related to healthcare. According to various embodiments of the present disclosure, the applications 130d may include at least one of an application designated to the electronic device 100 and an application received from another electronic device (e.g., a server 106, or the external electronic device 101).

The input/output interface 140 may serve as an interface capable of relaying a command or data input from the user or other external device to other component(s) of the electronic device 100. In addition, the input/output interface 140 may output a command or data received from other component(s) of the electronic device 100 to the user or the other external device.

The display 150 may include, for example, a Liquid Crystal Display (LCD), a Light Emitting Diode (LED) display, an Organic LED (OLED) display, an Active Matrix OLED (AMOLED) display, a MicroElectroMechanical Systems (MEMS) display, or an electronic paper display. The display 150 may display various contents (e.g., text, image, video, icon, or symbol) to, for example, the user. The display 150 may include a touch screen, and may receive, for example, a touch, gesture, proximity, or hovering input that is made using an electronic pen or a part of the user's body.

The communication interface 160 may set a communication between the electronic device 100 and other external electronic devices (e.g., the external electronic device 101 or the server 106). For example, the communication interface 160 may be connected to the network 162 through a wireless communication or a wired communication so as to communicate with the external electronic device 101.

For example, the wireless communication may use at least one of, for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), for example, as a cellular communication protocol. The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a communication network. The communication network may include at least one of a computer network, an internet, an internet of things, and a telephone network. According to an embodiment of the present disclosure, a protocol for communication between the electronic device 100 and an external electronic device 101 (e.g., a transport layer protocol, a data link layer protocol, or a physical layer protocol) may be supported by the applications 130d, the API 130c, the middleware 130b, the kernel 130a, and the communication interface 160.

According to an embodiment of the present disclosure, the application operation module 170 may execute at least one of the operations (or functions) implemented in the electronic device 100 so as to support the driving of the electronic device 100. For example, the server 106 may include a communication control server module 108 capable of supporting the application operation module 170 implemented in the electronic device 100. For example, the communication control server module 108 may include at least one component of the application operation module 170 to execute (e.g., substitute for) at least one of the operations executed by the application operation module 170.

The application operation module 170 may process at least some of information items acquired from the other components (e.g., the processor 120, the memory 130, the input/output interface 140, and the communication interface 160), and use them in various methods. For example, the application operation module 170 may control at least some of the functions of the electronic device 100 so that the electronic device 100 cooperates with other electronic device (e.g., the external electronic device 101 or the server 106), using the processor 120 or independently from the processor 120. The application operation module 170 may be incorporated in the processor 120. According to an embodiment of the present disclosure, at least one component of the application operation module 170 may be included in the server 106 (e.g., the communication control server module 108), and at least one operation implemented by the application operation module 170 may be supported from the server 106. Additional information for the application operation module 170 will be provided through FIG. 2.

Figure 2:
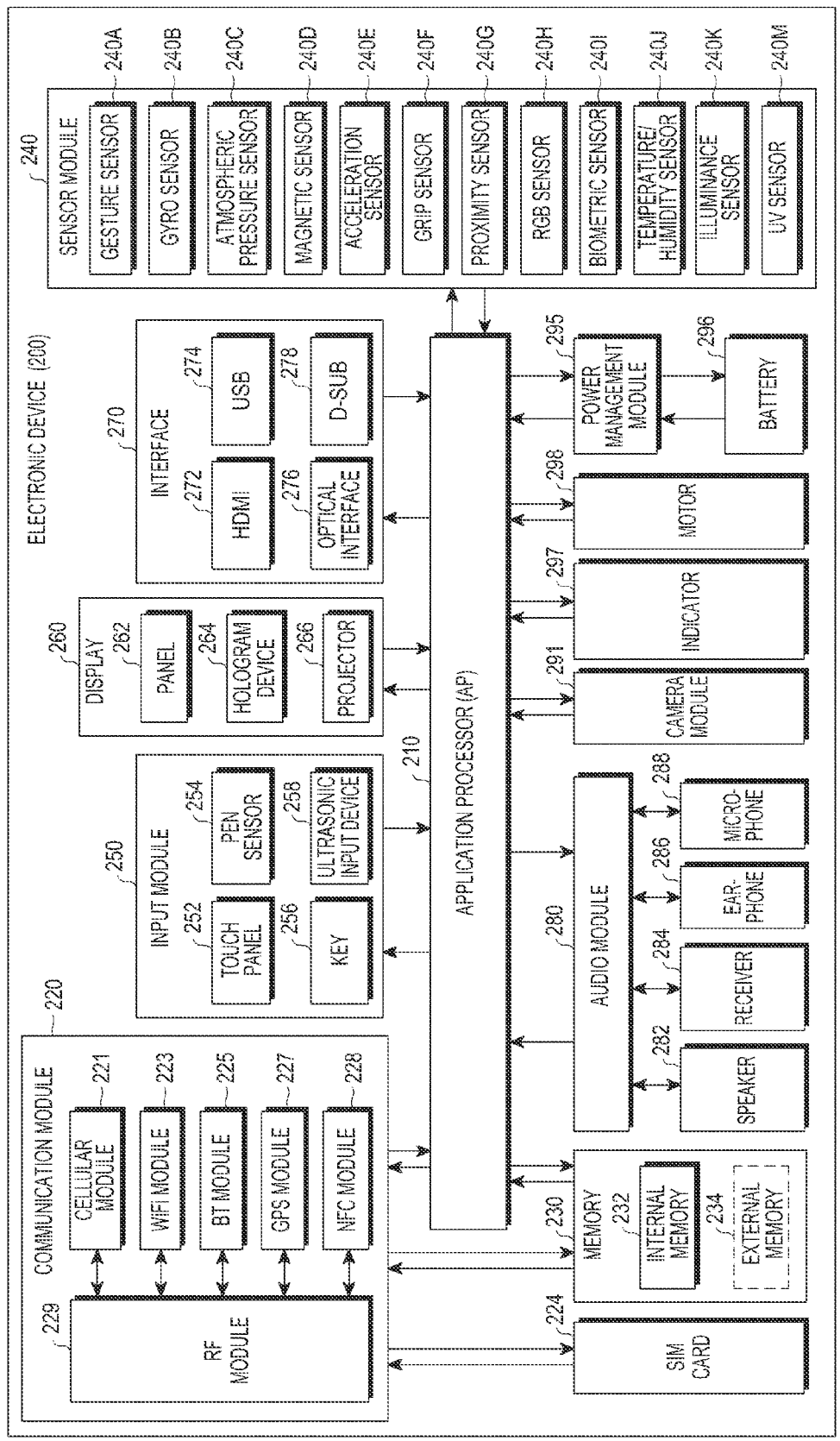
FIG. 2 is a block diagram of an electronic device according to various embodiments of the present disclosure.

FIG. 2 is a block diagram of an electronic device 200 according to various embodiments of the present disclosure.

Referring to FIG. 2, the electronic device 200 may include the entirety or a part of the electronic device 100 as described above. The electronic device 200 may include at least one AP 210, a communication module 220, a Subscriber Identification Module (SIM) card 224, a memory 230, a sensor module 240, an input module 250, a display 260, an interface 270, an audio module 280, a camera module 291, a power management module 295, a battery 296, an indicator 297, and a motor 298.

The AP 210 may drive an OS or an application program to control a plurality of hardware or software components connected to the AP 210, and to perform processing and arithmetic operation of various data including multimedia data. The AP 210 may be implemented by, for example, a System on Chip (SoC). According to an embodiment of the present disclosure, the AP 210 may further include (not shown) a Graphic Processing Unit (GPU) and/or an image signal processor. The AP 210 may include at least some of the components illustrated in FIG. 2 (e.g., the cellular module 221). The AP 210 may process a command or data received from at least one of other components (e.g., the non-volatile memory) by loading the command or data in a volatile memory, and store various data in a non-volatile memory.

The communication module 220 (e.g., the communication interface 160) may perform data transmission/reception in the communication between other electronic devices (e.g., the external electronic device 101 and the server 106) connected with the electronic device 200 through the network. According to an embodiment of the present disclosure, the communication module 220 may include at least one of a cellular module 221, a WiFi module 223, a Bluetooth (BT) module 225, a Global Positioning System (GPS) module 227, a Near Field Communication (NFC) module 228, and a Radio Frequency (RF) module 229.

The cellular module 221 may provide, for example, a voice call, a video call, a text messaging service, or an Internet service through a communication network (e.g., LTE, LTE-A, CDMA, WCDMA, UMTS, WiBro, or GSM). In addition, the cellular module 221 may perform discrimination and authentication within the communication network using, for example, a subscriber identification module (e.g., the SIM card 224). According to one embodiment, the cellular module 221 may perform at least some of the functions which may be provided by the AP 210. According to one embodiment, the cellular module 221 may include a CP.

Each of the WiFi module 223, the BT module 225, the GPS module 227, and the NFC module 228 may include a processor for processing data transmitted/received through, for example, the corresponding module. According to an embodiment, at least some (e.g., two or more) of the cellular module 221, the WiFi module 223, the BT module 225, GPS module 227, and the NFC module 228 may be incorporated in one Integrated Chip (IC) or IC package.

The RF module 229 may perform data transmission/reception, for example, transmission/reception of an RF signal. The RF module 229 may include, for example, a transceiver, a Power Amp Module (PAM), a frequency filter, or a low noise amplifier (LNA). In addition, the RF module 229 may include a connection with an antenna (not shown). According to one embodiment, at least one of the cellular module 221, the WiFi module 223, the BT module 225, the GPS module 227, and the NFC module 228 may perform transmission/reception of the RF signal through a separate RF module.

The SIM card 224 may include, for example, a card including a subscriber identification module and/or an embedded SIM, and may include unique identification information (e.g., an Integrated Circuit Card Identifier (ICCID)) or subscriber information (e.g., an International Mobile Subscriber Identity (IMSI)).

The memory 230 (e.g., the memory 130) may include an internal memory 232 or an external memory 234. The internal memory 232 may include at least one of, for example, a volatile memory (e.g., a Dynamic Random Access Memory (DRAM), a Static RAM (SRAM), or a Synchronous DRAM (SDRAM)), and a non-volatile memory (e.g., a Programmable Read-Only Memory (PROM), a One Time PROM (OTPROM), an Erasable and Programmable ROM (EPROM), an Electrically Erasable and Programmable ROM (EEPROM), a mask ROM, a flash ROM, or a flash memory (e.g., a Not And (NAND) flash memory or a Not Or (NOR) flash memory)). The external memory 234 may further include a flash drive, for example, a Compact Flash (CF), a Secure Digital (SD), a Micro-SD, a mini-SD, an extreme Digital (xD), or a memory stick. The external memory 234 may be functionally and/or physically connected with the electronic device 200 via various interfaces.

The sensor module 240 may measure a physical amount or sense an operating state of the electronic device 200, and convert the measured or sensed information to an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, and an Ultra-Violet (UV) sensor 240M. Additionally or alternatively, the sensor module 240 may include, for example, (not shown) an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, or a fingerprint sensor. The sensor module 240 may further include (not shown) a control circuit that controls one or more sensors included therein. In an embodiment, the electronic device 200 may further include (not shown) a processor configured to control the sensor module 240 as a part of the AP 210 or separately from the AP 210 so as to control the sensor module 240 when the AP 210 is in a sleep state.

The input device 250 may include a touch panel 252, a (digital) pen sensor 254, a key 256, or an ultrasonic input device 258. The touch panel 252 may recognize a proximity input by at least one of, for example, a capacitive type, a pressure-sensitive type, an IR type, and an ultrasonic type. In addition, the touch panel 252 may further include (not shown) a control circuit. The touch panel 252 may further include (not shown) a tactile layer so as to provide a tactile reaction to the user.

The (digital) pen sensor 254 may include (not shown) a recognition sheet, which is a part of the touch panel or separated from the touch panel. The key 256 may include, for example, (not shown) a physical button, an optical key, or a keypad. The ultrasonic input device 258 may sense sound waves with a microphone (e.g., the microphone 288) in the electronic device 200 through an input instrument that generates an ultrasonic signal, so as to confirm data.

The display 260 (e.g., the display 150) may include a panel 262, a hologram device 264, or a projector 266. The display 260 may include a configuration which is the same as or similar to the display 150 of FIG. 1. The panel 262 may be implemented, for example, to be flexible, transparent, or wearable. The panel 262 may be configured as one module with the touch panel 252. The hologram device 264 may show a stereoscopic image. The projector 266 may project light to a screen to display an image. The screen may be positioned, for example, inside or outside the electronic device 200. According to an embodiment of the present disclosure, the display 260 may further include (not shown) a control circuit that controls the panel 262, the hologram device 264, or the projector 266.

The interface 270 may include, for example, a HDMI 272, a USB 274, an optical interface 276, or a D-subminiature (D-sub) 278. The interface 270 may be incorporated, for example, in the communication interface 160 illustrated in FIG. 1. Additionally or alternatively, the interface 270 may include, for example, (not shown) a Mobile High-definition Link (MHL) interface, an SD card/Multi-Media Card (MMC) interface, or an Infrared Data Association (IrDA) standard interface.

The audio module 280 may bi-directionally convert a sound and an electrical signal. At least some components of the audio module 280 may be included, for example, in the input/output interface 140 illustrated in FIG. 1. The audio module 280 may process sound information input or output through, for example, a speaker 282, a receiver 284, an earphone 286, or a microphone 288.

The camera module 291 is a device capable of photographing a still image and a video image. According to one embodiment, the camera module 291 may include (not shown) one or more image sensors (e.g., a front sensor and a rear sensor), a lens, an Image Signal Processor (ISP), or a flash (e.g., an LED or a xenon lamp).

The power management module 295 may manage the power of the electronic device 200. The power management module 295 may include, for example, (not shown) a Power Management Integrated Circuit (PMIC), a charger IC, or a battery or fuel gauge. The PMIC may include for example, a wired charging type or a wireless charging type. The wireless charging type includes, for example, a magnetic resonance type, a self-induction type, or an electromagnetic wave type, and an additive circuit for wireless charging, for example, a circuit, such as a coil loop, a resonance circuit, or a rectifier circuit, may be added.

The battery gauge may measure, for example, a residual quantity of the battery 296 or a voltage, current, or temperature during charging. The battery 296 may store or generate electricity, and supply an electric power to the electronic device 200 using the stored or generated electricity. The battery 296 may include, for example, a rechargeable battery or a solar battery.

The indicator 297 may display a specific state of the electronic device 200 or a part thereof (e.g., the AP 210), for example, a booting state, a message state, or a charging state. The motor 298 may convert an electrical signal to a mechanical vibration and may generate, for example, vibration or a haptic effect. Although not illustrated, the electronic device 200 may include a processing device for supporting a mobile TV (e.g., a GPU). The processing device for supporting the mobile TV may process media data according to a standard of, for example, a Digital Multimedia Broadcasting (DMB), a Digital Video Broadcasting (DVB), or a media flow.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit' including one of hardware, software, and firmware, or a combination of two or more of the hardware, software, and firmware. The "module" may be interchangeably used with a term, such as unit, logic, logical block, component, or circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Array (FPGA), and a programmable-logic device for performing operations which have been known or are to be developed hereafter.

According to various embodiments of the present disclosure, at least a part of a device (for example, modules or functions thereof) or a method (for example, operations) according to the various embodiments of the present disclosure may be embodied by, for example, a command stored in a computer readable storage medium in a form of a programming module. When he command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least some of the programming modules may include, for example, a module, a program, a routine, a set of instructions, or a process for performing one or more functions.

The computer readable storage medium may include magnetic media such as a hard disc, a floppy disc, and a magnetic tape, optical media such as a compact disc ROM (CD-ROM) and a Digital Versatile Disc (DVD), magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Figure 3:
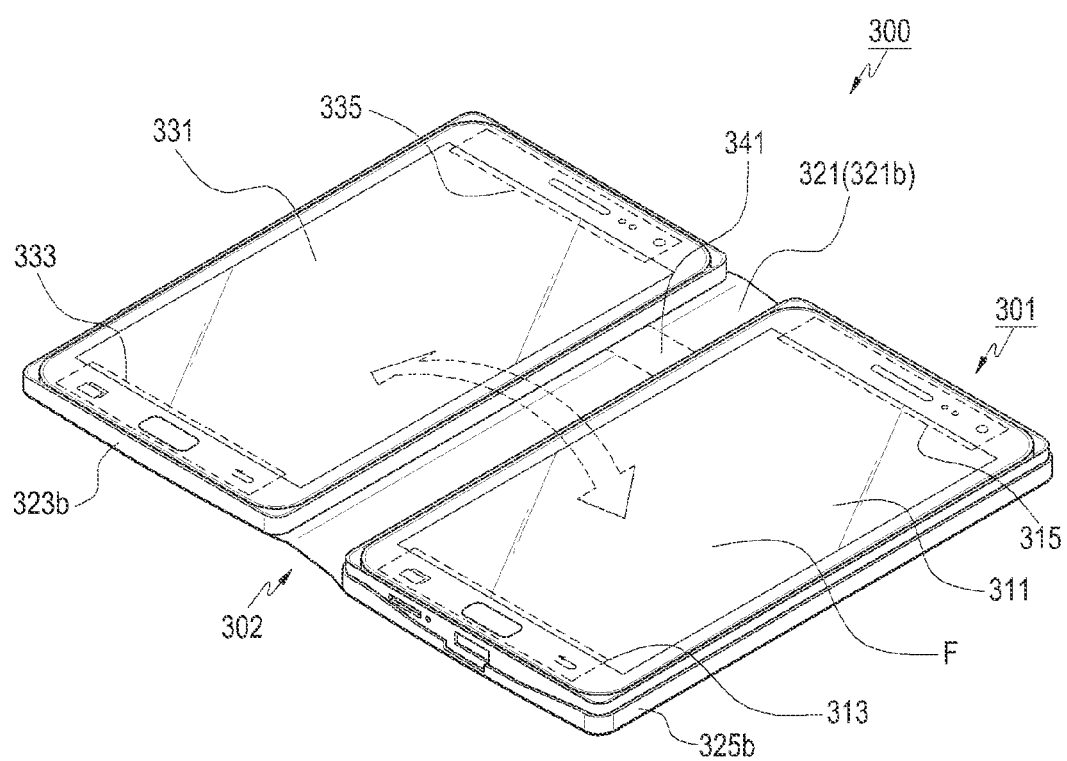
FIG. 3 is a perspective view illustrating an electronic device according to one of various embodiments of the present disclosure.

FIG. 3 is a perspective view illustrating an electronic device 300 according to one of various embodiments of the present disclosure.

Figure 4:
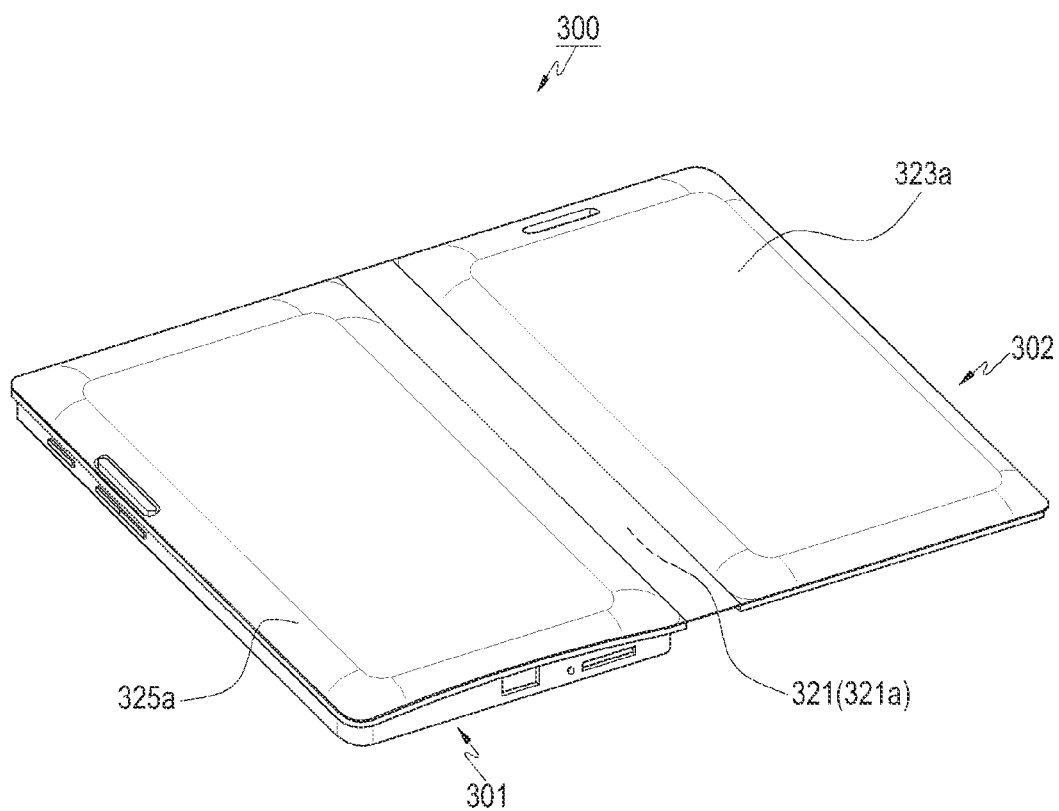
FIG. 4 is a perspective view illustrating an outer face of the electronic device according to one of various embodiments of the present disclosure.

FIG. 4 is a perspective view illustrating an outer face of the electronic device 300 according to one of the various embodiments of the present disclosure.

Figure 5:
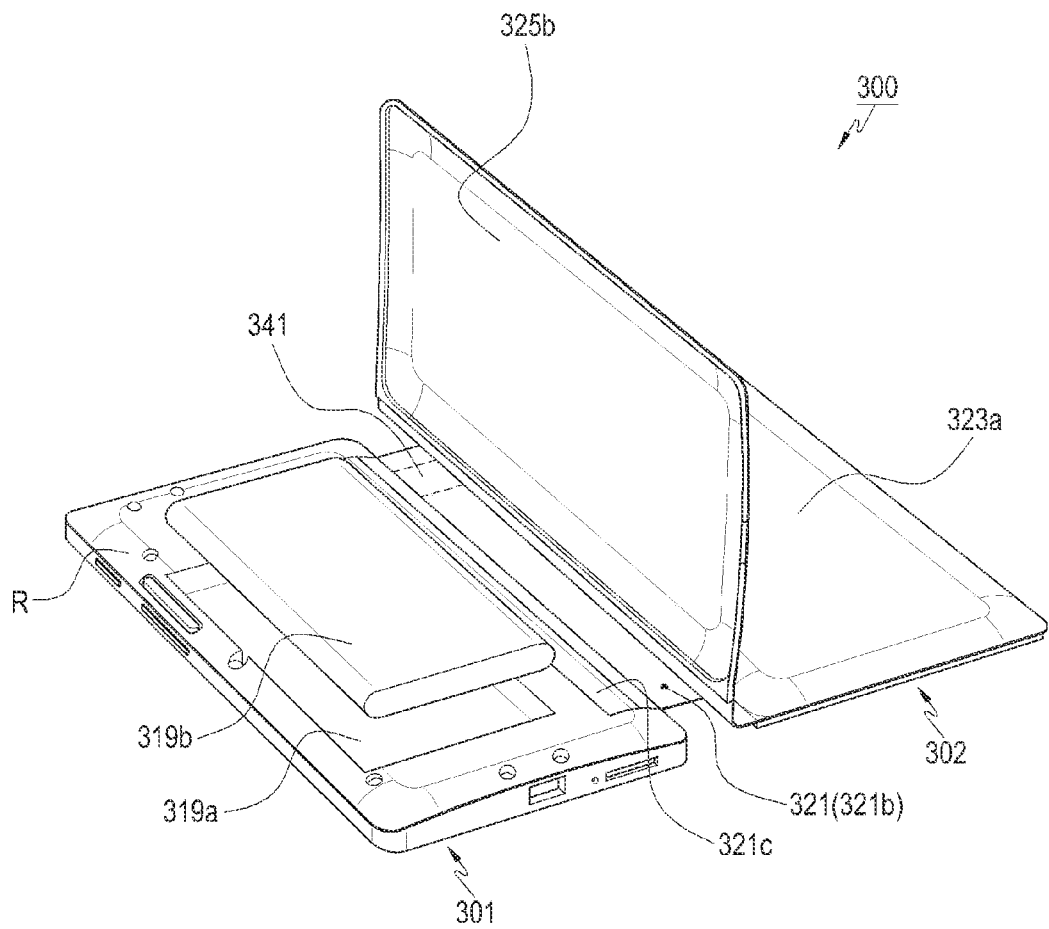
FIG. 5 is a perspective view illustrating a use example of the electronic device according to one of various embodiments of the present disclosure.

FIG. 5 is a perspective view illustrating a use example of the electronic device 300 according to one of the various embodiments of the present disclosure.

Referring to FIGS. 3 to 5, according to one of various embodiments of the present disclosure, the electronic device 300 may include a first body (e.g., a main body 301) and a second body (e.g., a cover 302). The electronic device 300 may constitute the electronic devices 100 and 200 or the external electronic device 101 which are described with reference to FIGS. 1 and 2. The electronic device 300 may include a configuration which is the same as or similar to that of the electronic device 100 of FIG. 1. The cover 302 may include a first cover portion (e.g., a first cover member 323a) that opens/closes a first face F of the main body 301, for example, the front face, a second cover portion (e.g., a second cover member 325a) disposed on a second face R of the main body 301, for example, the rear face, and a connection member 321 that connects the first and second cover members 323a and 325a to the main body 301. The second cover portion may be pivoted with respect to the first body to be separated from the first body. In an embodiment, the electronic device 300 may include a support member 321c that fixedly mounts the connection member 321 on the main body 301.

The main body 301 may include a first display device 311 mounted on the first face F, for example, the front face. For example, the first display device 311 may include a configuration which is the same as, or similar to, that of the display 150 of FIG. 1. According to an embodiment of the present disclosure, at a side of the first display device 311 on the first face F, for example, at the lower side 313, a first input device may be disposed. The first input device may include at least one of a key operated by a physical operation and a touch sensitive key that generates an input signal with only a touch. In an embodiment, at the lower side 313, a fingerprint recognition sensor (not shown) may be disposed. The first display device 311 may include a flexible display.

According to an embodiment of the present disclosure, at another side of the first display device 311 on the first face F, for example, at the upper side 315, a receiver may be disposed. The receiver may include, for example, (not shown) a speaker and/or a bone-conducting vibrator. At the upper side 315, various sensors may be disposed. The sensors may include at least one of, for example, a gesture sensor 240A, a proximity sensor 240G, an RGB sensor 240H, an illuminance sensor 240K, and a UV sensor 240M which are described above. According to an embodiment, a camera module 291 as described above may be disposed on the first face F.

The main body 301 may be provided with a battery mounting recess 319a, in which at least a part of a battery 319b may be mounted, for example, on the rear face R thereof. The electronic device 300 may be connected to an external or internal charging device so that the battery 319b can be charged. The user may use the electronic device 300 by replacing the battery 319b with another one. In an embodiment, the main body 301 may include (not shown) an additional battery (e.g., an auxiliary battery). For example, the additional battery may maintain the power of the electronic device 300 during the replacement of the battery 319b. In another embodiment, when the main body 301 and the cover 302 is fabricated in an integrated type (e.g., fabricated in a unibody form or bonded to or assembled with each other), the electronic device 300 may be used without replacing the battery 319b positioned within the main body 301.

In the cover 302, at least one of the first cover member 323a and the second cover member 325a may be pivotally coupled to the main body 301 through the connection member 321. At least a part of the connection member 321, for example, one end (or one side end) may be fixedly mounted on the main body 301. For example, the connection member 321 may be connected to an upper, lower, left or right portion of the main body 301. The first and second cover members 323a and 325a may be attached or bonded to another portion of the connection member 321 to be pivotally connected to the main body 301.

The first cover member 323a may open/close the first face F of the main body 301, for example, the first display device 311. According to one embodiment, the first cover member 323a may include a second display device 331. For example, the second display device 331 may be installed on an inner face of the first cover member 323a. The second display device 331 may output either a screen independent from, for example, the first display device 311 or a screen associated with the first display device 311. In addition, the first cover member 323a may include a touch screen.

As the first cover member 323a is pivoted with respect to the main body 301, the first cover member 323a may open/close the first display device 311. Since the second display device 331 is disposed on the first cover member 323a, the second display device 331 may be folded to face the first display device 311 by pivoting the first cover member 323a.

According to an embodiment of the present disclosure, a second input device may be disposed at the lower side 333 of the second display device 331. As the second input device, for example, a physically operated key or a touch key may be disposed, and in an embodiment, a bio-signal sensing sensor, such as a heartbeat sensor, may be disposed. At the upper side 335 of the second display device 331, a speaker module may be disposed. Additionally or alternatively, some of the above-mentioned sensors may be mounted at the upper side 335 of the second display device 331.

According to an embodiment of the present disclosure, the second cover member 325a may be fabricated in an integrated form with the main body 301 (e.g., fabricated in a unibody form or bonded to or assembled with each other) or provided to be attachable to/detachable from the second face R of the main body 301. When the second cover member 325a is mounted on the second face R of the main body 301, the battery mounting recess 319a (or the battery 319b mounted in the battery mounting recess 319a) and the support member 321c may be concealed and protected.

According to an embodiment of the present disclosure, at least a part of the second cover member 325a may be separated from the second face R as being pivoted. In a state where the second cover member 325a is pivoted from the connection member 321 to be separated from the second face R, the second cover member 325a may maintain the connection state in relation to the main body through the connection member 321. In a state where the second cover member 325a is separated from the second face R, the second cover member 325a may expose the battery mounting recess 319a (or, the battery 319b mounted in the battery mounting recess 319a). In the state where the second cover member 325a is separated from the second face R, the battery 319b may be separated from the battery mounting recess 319a or mounted in the battery mounting recess 319a.

The support member 321c may fix the connection member 321 to the main body 301. The support member 321c may be mounted at one side edge of the second face R of the main body 301 to be adjacent to, for example, the battery mounting recess 319a. As the support member 321c mounted, one end (or one side end) of the connection member 321 may be fixed between the support member 321c and the second face R. For example, the mounting structure of the support member 321c will be described in more detail below with reference to FIGS. 7 and 8.

The structure of the cover 302 will be described in more detail with reference to FIG. 6.

Figure 6:
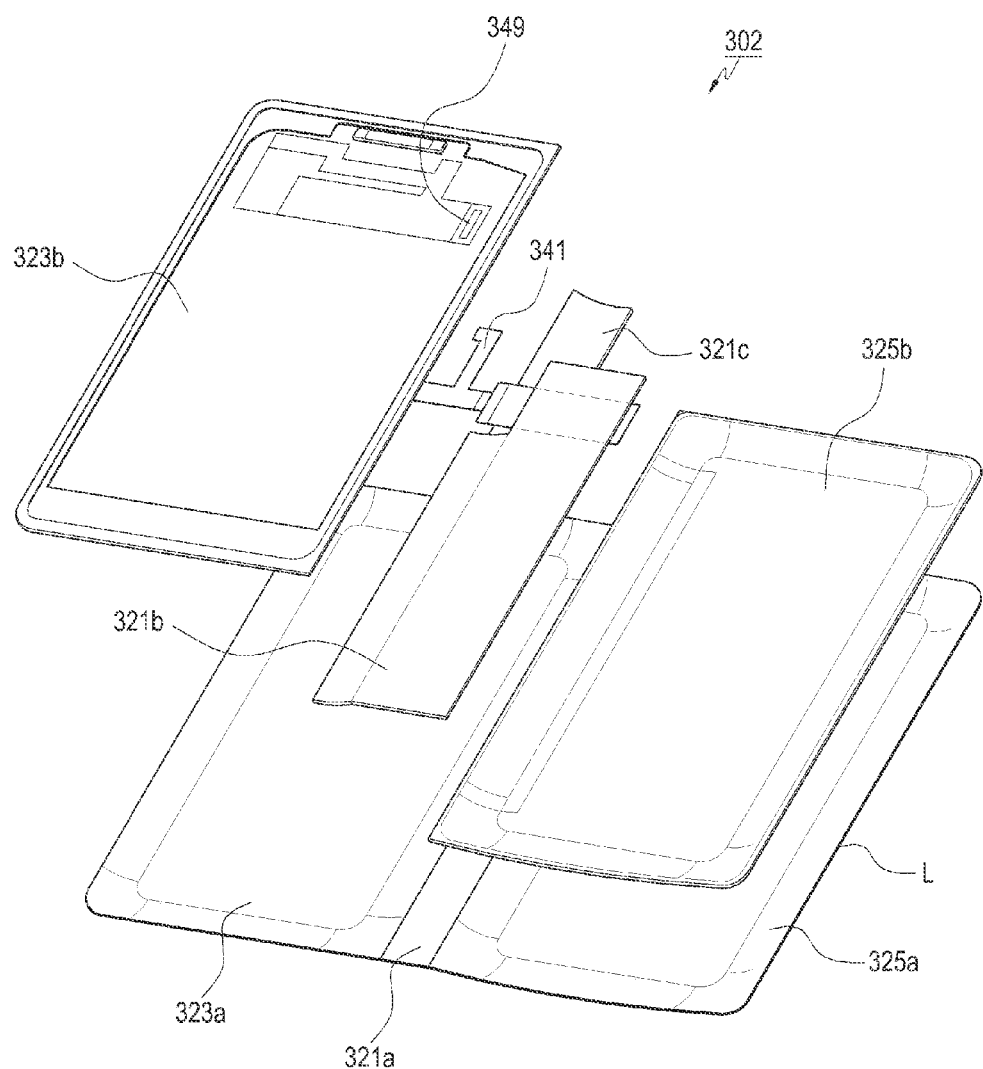
FIG. 6 is a perspective view illustrating a cover of the electronic device according to one of the various embodiments of the present disclosure in a disassembled state.

FIG. 6 is a perspective view illustrating the cover 302 of the electronic device 300 according to one of various embodiments of the present disclosure in a disassembled state.

In describing various embodiments of the present disclosure, descriptions on the cover 302 are divided into those of the connection member 321 and the first and second cover members 323a and 325a. However, this is merely for the convenience of description, such division does not limit of the present disclosure. For example, in the cover 302, the portion corresponding to the first face F of the main body 301 may be referred to as the first cover member 323a and the portion corresponding to the second face R of the main body 301 may be referred to as the second cover member 325a. In addition, at least a portion between the first and second cover member 323a and 325a may be referred to as the connection member 321.

According to an embodiment of the present disclosure, a member L of a flexible material may be disposed on the outer face of the cover 302. For example, the member L may be formed using a synthetic resin, a fabric, a genuine leather material, or an imitation leather material, which is cut into a proper shape. According to an embodiment of the present disclosure, at least a part of the outer face of the cover 302 may be formed using a flexible display. According to an embodiment, at least a part of the member L may include a rigid material. According to an embodiment, at least a part of the member L may include a conductive material.

For example, the outer faces of the first and second cover members 323a and 325a may be formed by the member L formed of a leather material. In addition, at least a part of the connection member 321 may be made of a leather material so that the first and second cover members 323a and 325a can freely pivot with respect to the main body 301. However, for example, the pivot of the second cover member 325a may be limited depending on whether the second cover member 325a is mounted on the second face R.

According to an embodiment of the present disclosure, the connection member 321 may include an outer member 321a and an inner member 321b. At least one of the outer member 321a and the inner member 321b may be formed of, for example, a soft material. The "soft material" refers to a material, of which the shape may be flexibly deformed. For example, the soft material may be a leather material. In an embodiment, the outer member 321a may interconnect the first and second cover members 323a and 325a. For example, the outer member 321a may be a part of the member L forming the outer face of the cover 302. For example, the outer member 321a is bonded to face the inner member 321b, and may be at least partially bonded or attached to the first and second cover members 323a and 325a or the portion that interconnects the first and second cover members 323a and 325a.

According to various embodiments of the present disclosure, a first circuit board 341 may be disposed between the main body 301 and the cover 302. For example, the first circuit board 341 may include a wiring that transmits a signal between the main body 301 and the main body 301. The first circuit board 341 may be formed using a flexible printed circuit board to be flexibly deformed together with the connection member 321. The first circuit board 341 may be disposed, for example, between the outer member 321a and the inner member 321b. For example, in a case where the outer member 321a is a part of the member L that forms the outer face of the cover 302, the inner member 321b may be formed in two or more layers, and the first circuit board 341 may be wired between the two layers that form the inner member 321b. Referring back to FIG. 5 again, when the second cover member 325a is pivoted and thus the second face R is opened, at least a part of the inner member 321b may be exposed. Even if at least a part of the inner member 321*b* is exposed, for example, the first circuit board 341 may be concealed by the inner member 321*b* formed in two or more layers.

According to an embodiment of the present disclosure, the first cover member 323*a* may include a bracket 323*b* disposed on the inner face thereof. The bracket 323*b* may be made of, for example, a rigid material to maintain the external shape of the cover 302, for example, the shape of the first cover member 323*a* in a predetermined shape. The bracket 323*b* may be utilized as a housing that supports the second display device 331. For example, the bracket 323*b* may be provided with a wiring hole 349 so as to provide a route for wiring the first circuit board 341. The first circuit board 341 may extend into the inside of the bracket 323*b* through the wiring hole 349 to be connected to the second display device 331.

Additionally or alternatively, the cover 302 may include various devices. The cover 302 may include, for example, (not shown) a touch sensor, a proximity sensor, a solar cell, an electronic ink display, a battery, an antenna, or a bio-sensor. For example, the various devices mounted on the cover 302 may exchange a signal with the main body 301 through the first circuit board 341. According to an embodiment, the main body 301 and the cover 302 may exchange a signal wirelessly.

According to an embodiment of the present disclosure, the second cover member 325*a* may include an inner cover 325*b* disposed on the inner face of the outer cover. For example, a part of the member L that forms the cover 302 may form the outer cover. The inner cover 325*b* may be made of a rigid material capable of keeping its shape constantly, such as a metal or a synthetic resin. As the second cover member 325*a* is pivoted, the inner cover 325*b* may be either mounted on the second face R of the main body 301 or separated from the second face R.

According to an embodiment of the present disclosure, the support member 321*c* may be positioned between the inner member 321*b* of the connection member 321 and the inner cover 325*b* of the second cover member 325*a* on the cover 302. For example, when the support member 321*c* is mounted on and fixed to the main body 301, at least a portion 321*e* of the connection member 321 may be fixed between the second face R and the support member 321*c*. As a result, the connection member 321 may connect the cover 302 to the main body 301.

Figure 7:
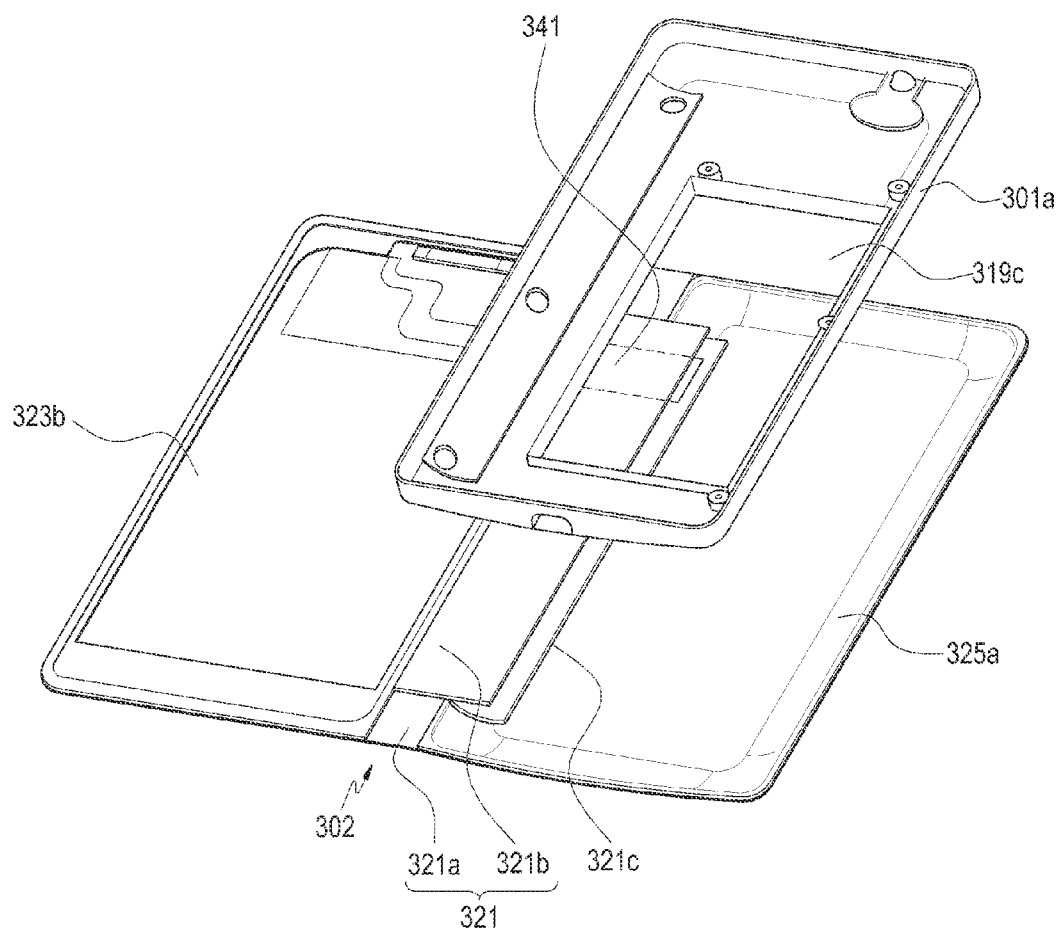
FIG. 7 is a perspective view illustrating a state where the cover of the electronic device according to one of the various embodiments of the present disclosure is assembled to the main body from a disassembled state.

FIG. 7 is a perspective view illustrating a state where the cover 302 of the electronic device 300 according to one of various embodiments of the present disclosure is assembled to the main body 301 from a disassembled state.

Figure 8:
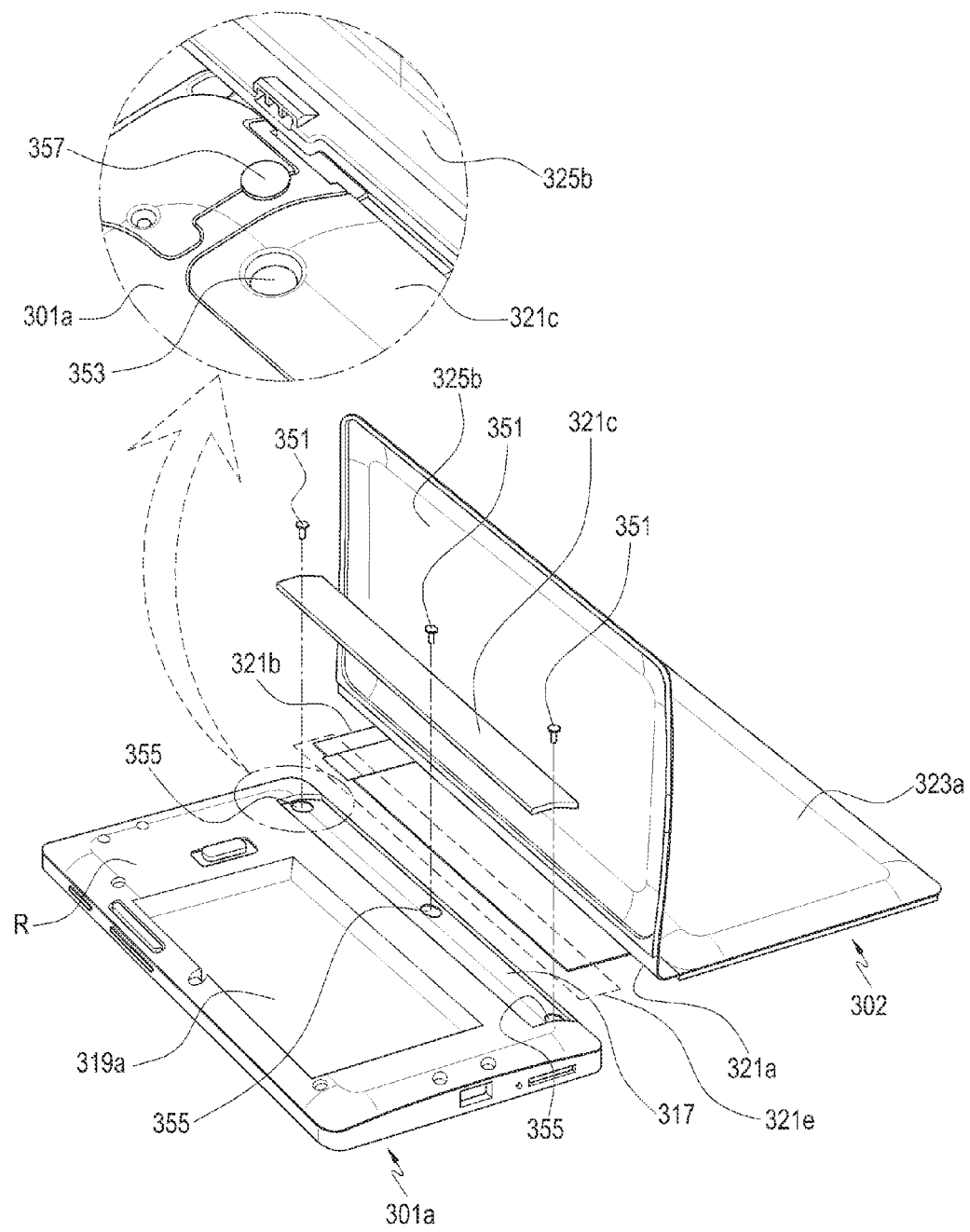
FIG. 8 is a perspective view illustrating another state in which the cover of the electronic device according to one of various embodiments of the present disclosure is assembled to the main body.

FIG. 8 is a perspective view illustrating another state in which the cover 302 of the electronic device 300 according to one of various embodiments of the present disclosure is assembled to the main body 301.

Referring to FIGS. 7 and 8, for example, the support member 321*c* may be mounted in and fixed to a fixing recess 317 on the second face R of the main body 301. The support member 321*c* may be concealed and protected by the second cover member 325*a* together with the battery mounting recess 319*a*. In FIGS. 7 and 8, reference numeral "301*a*" designates a "case" that accommodates the circuit board or the first display device, as a part of the main body 301. The case 301*a* may include an opening 319*c* formed through the inner face and the outer face thereof. As will be described below, the opening 319*c* may provide the battery mounting recess 319*a*.

According to an embodiment of the present disclosure, in a state where a part 321*e* of the connection member 321 is positioned above the fixing recess 317, the support member 321*c* may be fixed to the fixing recess 317. In order to fix the support member 321*c* to the fixing recess 317, the electronic device 300 may further include at least one fastening member 351. The fastening member 351 passes through a through-hole 353 formed in the support member 321*c* to be fastened to a fastening hole 355 formed in the fixing recess 317.

When the user arbitrarily disassembles or assembles the support member 321*c*, the first circuit board 341 wired through the connection member 321 may be damaged. Accordingly, the fastening member 351 may have a structure that cannot be arbitrarily released or fastened by an ordinary user. For example, when the fastening member 351 is a screw having a head of a shape, other than an ordinary cross recessed (i.e., Phillips) or straight slotted head, (e.g., a Torx "*" shape) may be used. In addition, when a separate plug or a sticker 357 is assembled or attached to the through hole 353 after the fastening member 351 is fastened, it is possible to prevent the user from accessing the fastened fastening member 351.

According to an embodiment of the present disclosure, the support member 321 may be assembled to the main body 301 in various structures. For example, the support member 321 may be assembled using an adhesive member (e.g., tape or resin) without the fastening member 351. In addition, for example, the support member 321 may be assembled using a mechanical fastening structure (e.g., a hook and a fastening recess). In addition, for example, the support member 321 may be formed integrally with the second face R of the main body 301.

Figure 9:
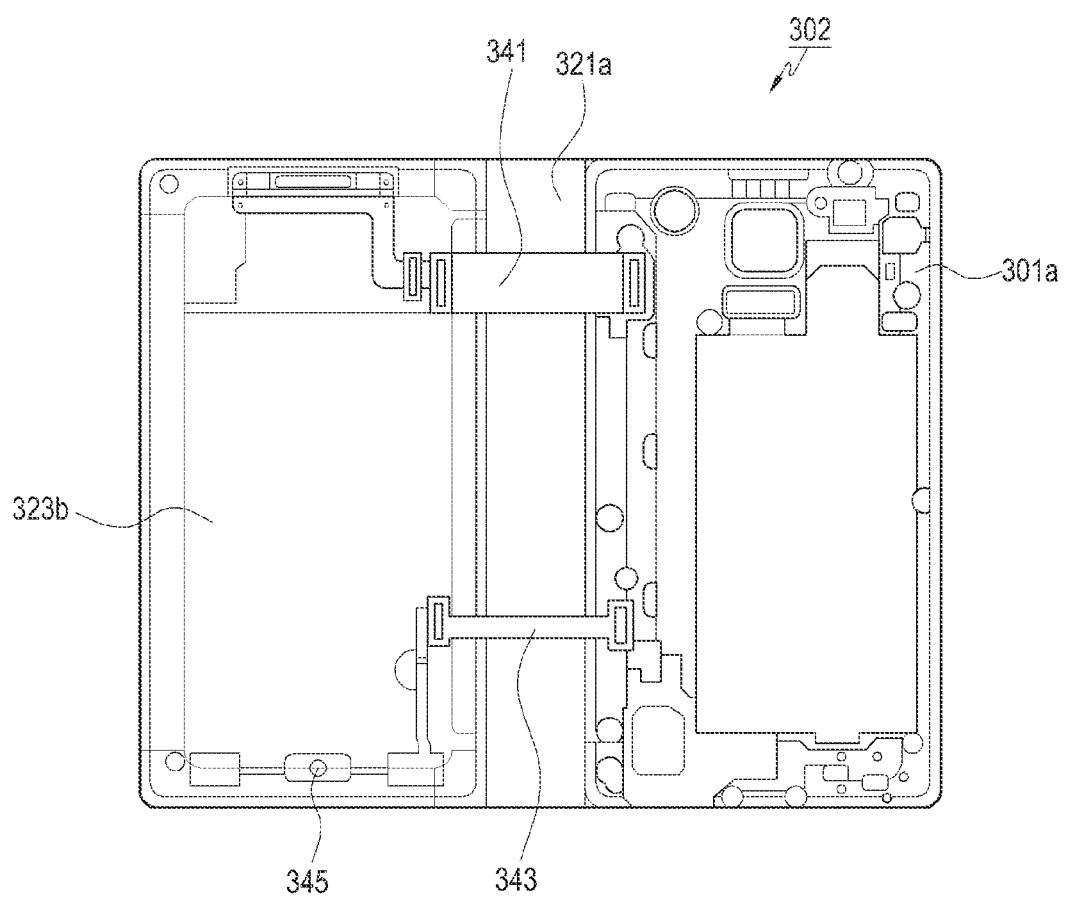
FIG. 9 is a view for describing an example of a wiring structure of an electronic device according to another one of various embodiments of the present disclosure.

FIG. 9 is a view for describing an example of a connection structure of an electronic device 300 including a cover 302 according to another one of various embodiments of the present disclosure.

Figure 10:
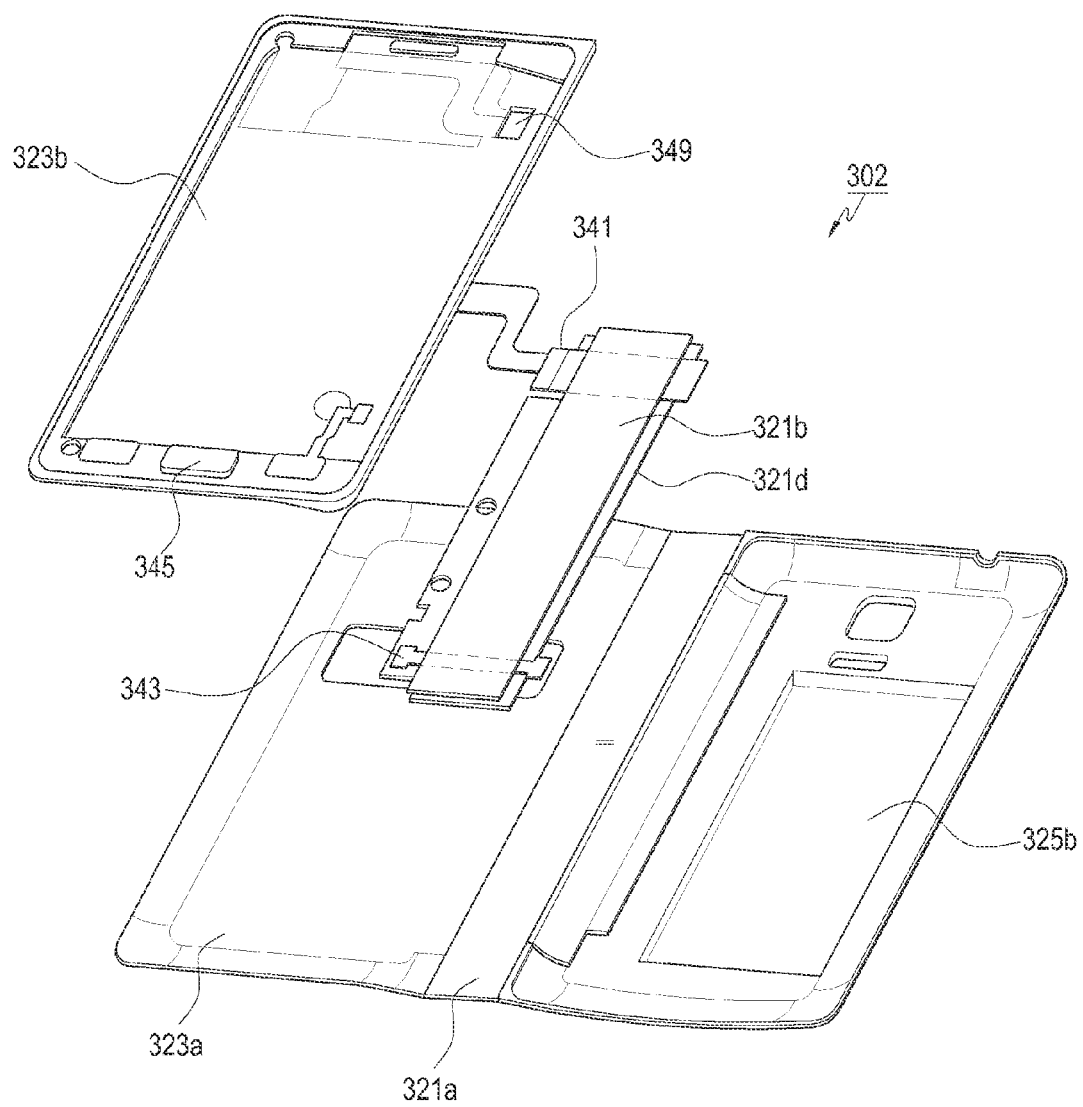
FIG. 10 is a perspective view illustrating a cover of the electronic device according to one of various embodiments of the present disclosure in a disassembled state.

FIG. 10 is a perspective view illustrating a cover 302 of the electronic device 300 according to another one of various embodiments of the present disclosure in a disassembled state.

Figure 11:
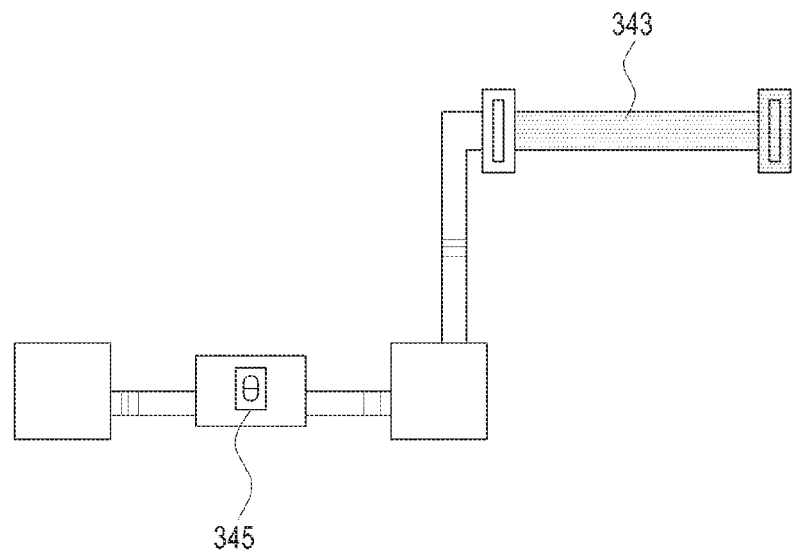
FIG. 11 is a plan view of a second circuit board of the electronic device according to one of various embodiments of the present disclosure.

FIG. 11 is a plan view of a second circuit board 343 of the electronic device 300 according to another one of various embodiments of the present disclosure.

Figure 12:
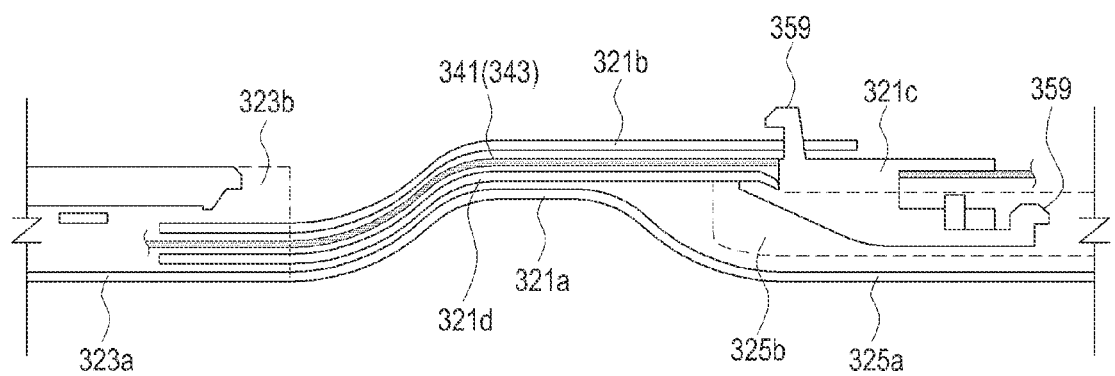
FIG. 12 is a cross-sectional view illustrating a structure of the cover of the electronic device according to one of various embodiments of the present disclosure.

FIG. 12 is a cross-sectional view illustrating the cover 302 illustrating a structure of the electronic device 300 according to another one of various embodiments of the present disclosure.

Referring to FIGS. 9 to 12, for example, the electronic device 300 may further include a second circuit board 343 disposed in or on of the connection member 321. According to an embodiment of the present disclosure, the second circuit board 343 may connect the second input device and the main body 301 with each other. The second circuit board 343 may be connected with the main body 301 in a state where the second circuit board 343 is coupled with the first circuit board 341, or each of the first and second circuit boards 341 and 343 may be independently connected with the main body 301. Within the bracket 323*b*, an input module 345 that constitutes the second input device may be disposed so as to configure the second input module, and the input module 345 may be connected to the main body 301 through the second circuit board 343. The input module 345 may include a dome switch or a touch key. In an embodiment, the input module 345 may include a fingerprint recognition sensor or a bio-signal sensing sensor. FIG. 9 illustrates a configuration in which the second circuit board 343 connects the input module 345 to the main body 301. However, according to various embodiments of the present disclosure, the second circuit board 343 may connect the input module 345 to the first circuit board 341. For example, the input module 345 may be connected to the main body 301 via the first and second circuit boards 341 and 343.

According to an embodiment of the present disclosure, the first and second circuit boards 341 and 343, which respectively connect the second display device 331 and the second input device (e.g., the input module 345) may be disposed in or on the connection member 321. In the embodiment of the present disclosure, the first and second circuit boards 341 and 343 may be wired between inner members 321b and 321d formed in two or more layers so that even if the first and second cover members 323a and 325a pivot, the first and second circuit boards 341 and 343 may be protected by the inner members 321b and 321d without being exposed to the outside.

Referring to FIG. 12, for example, the support member 321c may further include one or more fastening hooks 359 on the surface facing the main body 301. When the support member 321c is mounted in the fixing recess 317, each of the fastening hooks 359 may be fastened to the second face R to fix the support member 321c. The support member 321c may be stably fixed to the main body 301 by only the fastening hooks 359, but the electronic device 300 includes the fastening member 351 so as to fix the support member 321c to the main body 301 more rigidly as well as to prevent the user from arbitrarily separating the support member 321c and the main body 301.

Figure 13:
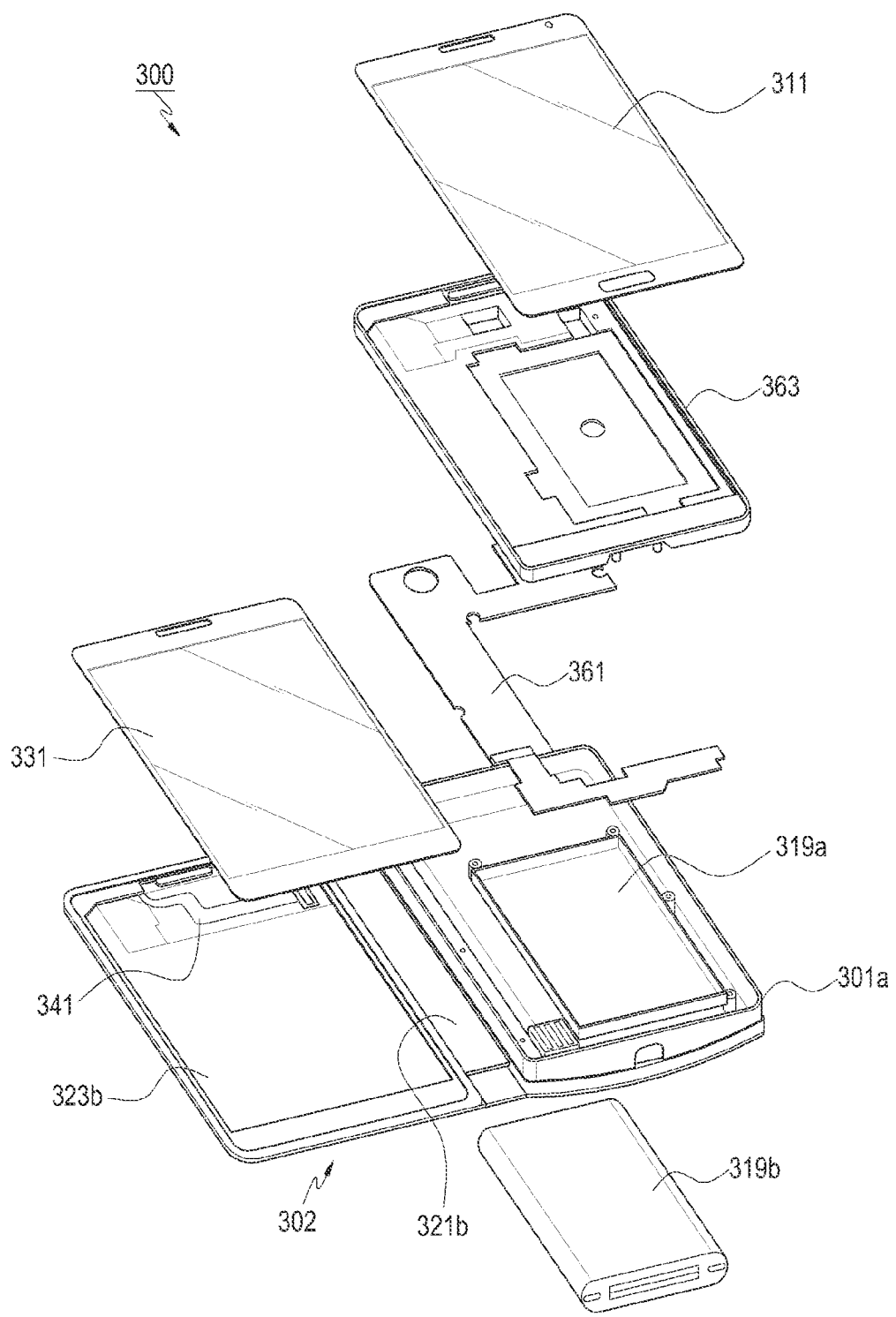
FIG. 13 is a perspective view illustrating an electronic device according to various embodiments in a disassembled state.

FIG. 13 is a perspective view illustrating an electronic device 300 according to various embodiments in a disassembled state.

Referring to FIG. 13, for example, the connection member 321 may be mounted in a case 301a included in the main body 301. For example, the main circuit board 361 of the electronic device 300 and the first display device 311 may be mounted in the case 301a. In addition, for example, the second display device 331 may be assembled with the cover 302. According to an embodiment of the present disclosure, in the state where, for example, the main circuit board 361 and the first display device 311 are assembled to the case 301a in advance, the connection member 321 may be connected and fixed to the main body 301.

The main circuit board 361 may be provided with circuit boards that perform the entire functions of the electronic device 301, such as the AP 210, the communication module 220, the memory 230, and the sensor module 240. The first and second circuit boards 341 and 343 may be connected to the main circuit board 361 within the main body 301. Accordingly, the devices included in the cover 302 (e.g., the second display device 331 or the second input device) may be controlled by the circuit devices included in the main body 301. According to an embodiment, the cover 302 may include circuit devices such as the AP 210, the communication module 220, the memory 230, and the sensor module 240. As a result, the cover 302 may not be controlled by the main body 301.

According to an embodiment of the present disclosure, within the case 301a, an additional bracket 363 that supports the first display device 311 may be mounted. When the additional bracket 363 is mounted within the case 301a, the first display device 311 and the main circuit board 361 may be separated from each other.

According to an embodiment of the present disclosure, the bracket 363 mounted in the case 301a may separate the inner space of the case 301a and the battery mounting recess 319a from each other. For example, the battery mounting recess 319a may have a structure that is opened on the rear face of the main body 301, for example, the second face R while being enclosed by the inner wall of the opening 319c and the bracket 363 mounted in the case 301a. Referring to FIG. 13, the battery mounting recess 319a is illustrated in a state where it is closed by the second cover member 325a, for example, the inner cover 323b. In the state where the battery mounting recess 319a is opened, for example, in the state where the second cover member 325a is pivoted to be separated from the main body 301, the battery 319b may be mounted in the battery mounting recess 319a.

According to an embodiment of the present disclosure, as the first cover member 323a is pivoted, the first and second display devices 311 and 331 may be folded in the state where they are face each other. The user may pivot the first cover member 323a so as to variously utilize the electronic device 300 in the state where the first and second display devices 311 and 331 are expanded. In the state where the first and second display devices 311 and 331 are expanded, different screens (e.g., documents) may be output on the display devices, respectively, to be comparatively reviewed. In addition, a touch keypad is implemented on one of the display devices and a desired screen is output through the other of the display devices so as to input information items or enjoy a game. While a multimedia service is being used, the user may use the first and second display devices 311 and 331 in a state where one of the first and second display devices 311 and 331 is mounted on a flat face (e.g., a table) and the other is put on the skew. For example, a video image may be reproduced through the electronic device 300 in the state where the main body 301 is mounted on a flat face and the second display device 331 is disposed obliquely. In an embodiment, the electronic device 300 may recognize the obliqueness so as to determine a program or function to be provided through the electronic device 300.

According to various embodiments of the present disclosure, the cover 302 may include another battery (not illustrated). The other battery may be charged through a solar cell included in the cover 302 or the main body 301, or from an external wired or wireless charger.

According to an embodiment of the present disclosure, the electronic device 300 may recognize that at least a part of the second cover member 325a is separated from the second face R. For example, the inner cover 325b and the second face R may be electrically connected with various connection structures. For example, the various connection structures may include at least one of a c-clip, a spring, a pogo pin, a magnet, a conductive pad, a switch, an electromagnetic coupling, and a proximity sensor. For example, when at least a part of the second cover member 325a is separated from the second face R, the electronic device 300 may recognize a change of the connection.

When the second cover member 325a is separated, the electronic device 300 may operate, for example, at least one of the main body 301 and the cover 302 in a battery replacement mode. The battery replacement mode may refer to a state in which, for example, the function of the electronic device 300 is operated in a condition where the power consumption is small. In addition, for example, the battery replacement mode may include an operation of selecting one of the battery 319b include in the main body 301 and another battery included in the cover 302 as a power source for supplying a current to the cover 302 or the main body 301.

According to an embodiment of the present disclosure, the main body 301 may be supplied with the current from another battery included in the cover 302 when at least a part of the second cover member 325a is separated from the second face R. As a result, even if the battery 319b is separated from the main body 301, the main body 301 may maintain an activated state (e.g., the state where the power is turned ON) using the current supplied from another battery. According to one embodiment, the electronic device 300 may recognize that at least a part of the second cover member 325a is coupled to the second face R. For example, when the battery 319b is replaced by a new one, the second cover member 325a may be coupled to the second face R. The electronic device 300 may recognize this through various connection structures. As a result, the electronic device 300 may release the battery replacement mode for at least one of the main body 301 and the cover 302.

According to an embodiment of the present disclosure, the electronic device 300 may be connected with other external electronic devices wirelessly. When the electronic device 300 is operated at the battery replacement mode, the electronic device 300 may transmit information for this to the other electronic device (e.g., external electronic device 101). Upon receiving the information related to the battery replacement from the electronic device 300, the other electronic device may standby, for example, data transmission to the electronic device 300. In addition, for example, the other electronic device may receive the contents to be transmitted to the electronic device 300 from a server in place of the electronic device 300. In addition, the other electronic device may backup, for example, designated data of the electronic device 300.

While the present disclosure has been shown and described with reference to certain embodiments thereof, it will be understood by those skilled in the art that various changes in form and details may be made therein without departing from the spirit and scope of the present disclosure as defined by the appended claims.

For example, although a specific embodiment of the present disclosure exemplified a configuration in which the first cover member is pivoted to the left of the main body, the direction where the first cover member is expanded may be variously implanted depending on the fixing positions of the connection member and the support member. It is evident that the direction, in which the first cover member, for example, the second display device main body, is expanded with respect to the main body, for example, the first display device, may be properly designed by a person ordinarily skilled in the art in consideration of, for example, a use or a used environment of the electronic device.

In addition, although a specific embodiment of the present disclosure exemplified that the connection member may be fabricated using, for example, a genuine leather or an imitation leather, the connection member may be fabricated using any other suitable material (for example, silicon or a flexible high molecular synthetic resin, such as rubber).

In addition, although a specific embodiment of the present disclosure is disclosed a configuration in which the second circuit board is provided to connect the second input device to the main body when the second input device is disposed around the second display device, the second input device may be connected to the main body via the first circuit board. For example, the function of the second circuit board may also be implemented practically through the first circuit board.

In addition, although a specific embodiment of the present disclosure exemplified that, for example, the first and second input devices and various sensors may be disposed around the first and second display devices, the positions may be variously changed, and the first and second display devices may implement an input screen (e.g., a touch screen) by themselves.

In addition, although no specific embodiment of the present disclosure disclosed, it is evident that a connector for connecting a charger, a computer, an earphone, or the like, a power key, a volume key, a hole for inputting a sound, or the like may be disposed on the side faces of the main body.

According to various embodiments of the present disclosure, an electronic device may include a main body having a first face, on which a first display device is disposed, and a cover including a first cover member, on which a second display device is disposed, and a second cover member disposed on a second face of the main body, in which the second display device may be electrically connected to the main body.

According to various embodiments of the present disclosure, as the first cover member is pivoted, the second display device may be folded to face the first display device.

According to various embodiments of the present disclosure, the cover may further include a connection member mounted to be connected to the main body, and each of the first and second cover members may be pivotally connected to the connection member.

According to various embodiments of the present disclosure, the second cover member may be attached to/detached from the second face of the main body as being pivoted with respect to the connection member.

According to various embodiments of the present disclosure, the connection member may include an outer member made of a flexible material and connected to the first and second cover members, and an inner member made of a flexible material and coupled to face the outer member.

The electronic device may further include a first circuit board disposed between the outer member and the inner member so as to electrically connect the main body and the second display device with each other.

According to various embodiments of the present disclosure, the second cover member may include an outer cover connected to the connection member; and an inner cover mounted on an inner face of the outer cover, in which, as the second cover member is pivoted, the inner cover may be attached to/detached from the second face of the main body.

According to various embodiments of the present disclosure, the electronic device may further include a battery mounting recess formed on the second face of the main body, in which the inner cover may be mounted on the second face of the main body to conceal the battery mounting recess.

According to various embodiments of the present disclosure, the electronic device may further include a support member provided to be attachable to/detachable from the main body, in which the support member may fix the one end of the connection member in a state where the one end of the connection member is connected to the main body.

According to various embodiments of the present disclosure, the support member may include fastening hooks formed on an inner face thereof, in which the fastening hooks may be fastened to the second face of the main body.

According to various embodiments of the present disclosure, the electronic device may further include a fastening member that penetrates the support member to be fastened to the second face of the main body so that the support member is fixed to the main body.

According to various embodiments of the present disclosure, the electronic device may further include an input device disposed around the second display device; and at least one circuit board that connects each of the second display device and the input device to the main body, in which the circuit board may be formed as a flexible printed circuit board wired via the connection member.

According to another one of various embodiments of the present disclosure, an electronic device may include a main body including a first face, on which a first display device is mounted, a first cover member including an inner face, on which a second display device is mounted, and opening/closing the first face of the main body; a second cover member provided to be attachable to/detachable from a second face of the main body, a connection member at least partially fixed to the main body, each of the first and second cover members being pivotally connected to the connection member; and a support member that fixes one end of the connection member to the main body.

According to various embodiments of the present disclosure, the electronic device may further include a fixing recess formed on the second face of the main body, and the support member may be mounted in and fixed to the fixing recess.

According to various embodiments of the present disclosure, the one end of the connection member may be fixed between the fixing recess and the support member.

According to various embodiments of the present disclosure, the electronic device may further include a battery mounting recess formed on the second face of the main body adjacent to the fixing recess, in which the second cover member may be mounted on the second face on the main body to conceal the support member and the battery mounting recess.

According to various embodiments of the present disclosure, the support member may include fastening hooks formed on an inner face thereof, in which the fastening hooks may be fastened to the second face of the main body.

According to various embodiments of the present disclosure, the electronic device may further include a fastening member that penetrates the support member to be fastened to the second face of the main body so that the support member is fixed to the main body.

According to various embodiments of the present disclosure, the first cover member may further include a bracket, on which the second display device is mounted.

According to various embodiments of the present disclosure, the electronic device may further include, a wiring hole formed in the bracket, and a first circuit board that connects the second display device to the main body, in which the first circuit board may be wired through the connection member and extend to an interior of the bracket through the wiring hole.

According to various embodiments of the present disclosure, the electronic device may further include a first input device provided around the first display device, and a second input device provided around the second display device.

According to various embodiments, the second input device may include a bio-signal sensing sensor.

According to various embodiments of the present disclosure, the electronic device may further include a second circuit board wired through the connection member to connect the second input device to the main body.

According to various embodiments of the present disclosure, the support member may fix the one end of the connection member at a side edge on the second face of the main body, and the second cover member is mounted on the second face of the main body to conceal the support member.

According to still another one of various embodiments of the present disclosure, an electronic device may include a first body including a display, and a second body pivotally coupled to the first body, in which the second body may include a first cover portion which is changeable in position with respect to the display, and a second cover portion fixed to at least one part of the first body at one side thereof, another side of the second cover portion being attachable to/detachable from another part of the first member.

According to various embodiments of the present disclosure, the electronic device may further include a battery attachable to/detachable from the first body.

According to various embodiments of the present disclosure, the first cover portion may include a flexible display.

According to various embodiments of the present disclosure, the second cover portion may be separated from the first body to be pivotable.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a main body having a front face, on which a first display device is disposed; and
a cover including a first cover member, on which a second display device is disposed, and a second cover member disposed on a rear face of the main body,
wherein the second display device is electrically connected to the main body,
wherein the first cover member further includes a connection member mounted to be connected to the main body, and
wherein each of the first and second cover members is pivotally connected to the connection member.

2. The electronic device of claim 1, wherein the second cover member is alternately attached to and detached from the rear face of the main body as being pivoted with respect to the connection member.

3. The electronic device of claim 1,
wherein the connection member includes an outer member comprising a flexible material and connected to the first and second cover members, and a flexible inner member coupled to face the outer member, and
wherein the electronic device further comprises a first circuit board disposed between the outer member and the inner member so as to electrically connect the main body and the second display device with each other.

4. The electronic device of claim 1,
wherein the second cover member includes an outer cover connected to the connection member, and an inner cover mounted on an inner face of the outer cover, and
wherein as the second cover member is pivoted, the inner cover alternately is attached to and detached from the rear face of the main body.

5. The electronic device of claim 4, further comprising:
a battery mounting recess on the rear face of the main body,
wherein the inner cover is mounted on the rear face of the main body so as to conceal the battery mounting recess.

6. The electronic device of claim 1, further comprising:
a support member provided to be alternately attachable to and detachable from the main body,
wherein the support member fixes the one end of the connection member in a state where the one end of the connection member is connected to the main body.

7. The electronic device of claim 1, further comprising:
an input device disposed around the second display device; and
at least one circuit board that connects each of the second display device and the input device to the main body,
wherein the circuit board is configured as a flexible printed circuit board wired via the connection member.

8. The electronic device of claim 1, wherein the second display device comprises a screen associated with the first display device.

9. The electronic device of claim 1, wherein the second display device comprises a screen independent of the first display device.

10. An electronic device comprising:
a main body including a first face, on which a first display device is mounted;
a first cover member including an inner face, on which a second display device is mounted, wherein the first cover member alternately opens and closes the first face of the main body;
a second cover member provided to be alternately attachable to and detachable from a second face of the main body;
a connection member at least partially fixed to the main body, each of the first and second cover members being pivotally connected to the connection member; and
a support member that fixes one end of the connection member to the main body.

11. The electronic device of claim 10, further comprising:
a fixing recess formed on the second face of the main body,
wherein the support member is fixedly mounted in the fixing recess.

12. The electronic device of claim 11, wherein the one end of the connection member is fixed between the fixing recess and the support member.

13. The electronic device of claim 11, further comprising:
a battery mounting recess formed on the second face of the main body adjacent to the fixing recess,
wherein the second cover member is mounted on the second face on the main body to conceal the support member and the battery mounting recess.

14. The electronic device of claim 10, wherein the first cover member further includes a bracket, on which the second display device is mounted.

15. The electronic device of claim 14, further comprising:
a wiring hole formed in the bracket; and
a first circuit board that connects the second display device to the main body,
wherein the first circuit board is wired through the connection member and extends to an interior of the bracket through the wiring hole.

16. The electronic device of claim 10, further comprising:
a first input device provided around the first display device; and
a second input device provided around the second display device.

17. The electronic device of claim 16, wherein the second input device includes a bio-signal sensing sensor.

18. The electronic device of claim 16, further comprising:
a second circuit board wired through the connection member to connect the second input device to the main body.

19. The electronic device of claim 10, wherein the support member fixes the one end of the connection member at a side edge on the second face of the main body, and the second cover member is mounted on the second face of the main body to conceal the support member.

20. The electronic device of claim 10, wherein the second display device comprises a screen associated with the first display device.

21. The electronic device of claim 10, wherein the second display device comprises a screen independent of the first display device.

22. An electronic device comprising:
a first body including a display disposed on a front face of the first body; and
a second body pivotally coupled to the first body,
wherein the second body includes:
a first cover member which is changeable in position with respect to the display, and
a second cover member fixed to at least one part of the first body at one side thereof, another side of the second cover member being alternately attachable to and detachable from a rear face of the first body,
wherein the first cover member further includes a connection member mounted to be connected to the first body, and
wherein each of the first and second cover members is pivotally connected to the connection member.

23. The electronic device of claim 22, further comprising:
a battery alternately attachable to and detachable from the first body.

24. The electronic device of claim 22, wherein the first cover member includes a flexible display.

25. The electronic device of claim 22, wherein the second cover member is separated from the first body to be pivotable.

* * * * *